United States Patent
Cooper et al.

(10) Patent No.: US 9,278,718 B1
(45) Date of Patent: Mar. 8, 2016

(54) ANTI-THEFT DEVICE FOR TAILGATES

(71) Applicant: Ford Global Technologies, LLC, Dearborn, MI (US)

(72) Inventors: Geoffrey John Cooper, Canton, MI (US); Hossein Jacob Sadri, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/645,945

(22) Filed: Mar. 12, 2015

(51) Int. Cl.
*B62D 33/03* (2006.01)
*B62D 33/027* (2006.01)

(52) U.S. Cl.
CPC .................................. *B62D 33/0273* (2013.01)

(58) Field of Classification Search
CPC ...... B60J 5/167; B60J 5/102; B62D 33/0273; B62D 33/03
USPC .......................... 296/57.1; 403/316, 317, 318
See application file for complete search history.

(56) References Cited

U.S. PATENT DOCUMENTS

| | | | |
|---|---|---|---|
| 4,981,320 A | 1/1991 | Bowman | |
| 5,004,287 A | 4/1991 | Doyle | |
| 5,415,058 A | 5/1995 | Young et al. | |
| 5,707,095 A * | 1/1998 | Pribak | B62D 33/0273 16/82 |
| 5,823,022 A | 10/1998 | Barker | |
| 5,857,738 A | 1/1999 | Hamilton | |
| 9,139,236 B2 * | 9/2015 | Waskie | B62D 33/0273 |
| 2003/0116991 A1* | 6/2003 | Katulka | B62D 33/0273 296/57.1 |
| 2005/0212320 A1* | 9/2005 | Ousley | B62D 33/0273 296/57.1 |
| 2011/0089711 A1* | 4/2011 | Zielinsky | B62D 33/0273 296/57.1 |
| 2011/0181068 A1* | 7/2011 | Zielinsky | B60P 1/26 296/57.1 |
| 2015/0115644 A1* | 4/2015 | Waskie | B62D 33/0273 296/57.1 |

* cited by examiner

*Primary Examiner* — Jason S Morrow
(74) *Attorney, Agent, or Firm* — Raymond Coppiellie; Brooks Kushman P.C.

(57) ABSTRACT

A tailgate assembly of a truck includes an anchor on the truck and a cable attachable between the tailgate and the anchor. A clip of the cable defines an opening for receiving the anchor. A finger secures the clip to the anchor and is deflectable to allow disconnection of the clip and the anchor. A lock is disposed on the clip and is slidable between a blocking position that prevents deflection of the finger and a releasable position that allows deflection of the finger.

20 Claims, 3 Drawing Sheets

ANTI-THEFT DEVICE FOR TAILGATES

TECHNICAL FIELD

The present disclosure relates to an anti-theft device for a tailgate cable of a pickup truck.

BACKGROUND

Vehicles, such as pickup trucks, include a box having a bed, opposing longitudinal sidewalls, a headboard, and a tailgate. The tailgate is pivotally attached to the sidewalls and movable between an open position and a closed position. Latches are disposed on an upper portion of the tailgate to hold the tailgate in the closed position, and tension members are connected between the sidewalls and the tailgate to support the tailgate when in the open position. Tailgates are typically removable from the box to increase utility of the pickup truck. This makes it possible for a thief to steal the tailgate by disconnecting the cables and removing the tailgate from the box.

An increased emphasis on fuel efficiency has led to a desire for lightweight vehicle components, such as aluminum-alloy components. Aluminum alloys are typically lighter than steel alloys. Consequently, aluminum alloy tailgates are lighter making them easier to steal.

SUMMARY

According to one embodiment, a tailgate assembly of a truck includes an anchor on the truck and a cable attachable between the tailgate and the anchor. A clip of the cable defines an opening for receiving the anchor. A finger secures the clip to the anchor and is deflectable to allow disconnection of the clip and the anchor. A lock is disposed on the clip and is slidable between a blocking position that prevents deflection of the finger and a releasable position that allows deflection of the finger.

According to another embodiment, a tailgate assembly of a truck includes a tailgate attachable to the truck, an anchor on the truck, and a tension member attachable between the tailgate and the anchor. A clip is attached to an end of the tension member and defines an opening for receiving the anchor. A finger is attached to the clip and engages with the anchor. The finger is deflectable to allow disconnection of the clip and anchor. A lock assembly is movable on the clip between a blocking position and a releasable position. The lock assembly prevents deflection of the finger when in the blocking position and allows deflection of the finger when in the releasable position. The lock assembly is affixed to the clip in the blocking position by a locking element.

According to yet another embodiment, a tailgate cable for a truck includes a clip and an anti-theft device. The clip is connectable to a post on the truck and has a finger biased to engage the post to prevent disconnection of the clip and post. The finger is deflectable to disengage the post. The anti-theft device surrounds four sides of the clip to prevent displacement of the finger locking the clip to the post. A threaded fastener is receivable through the body and finger to locate the device.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
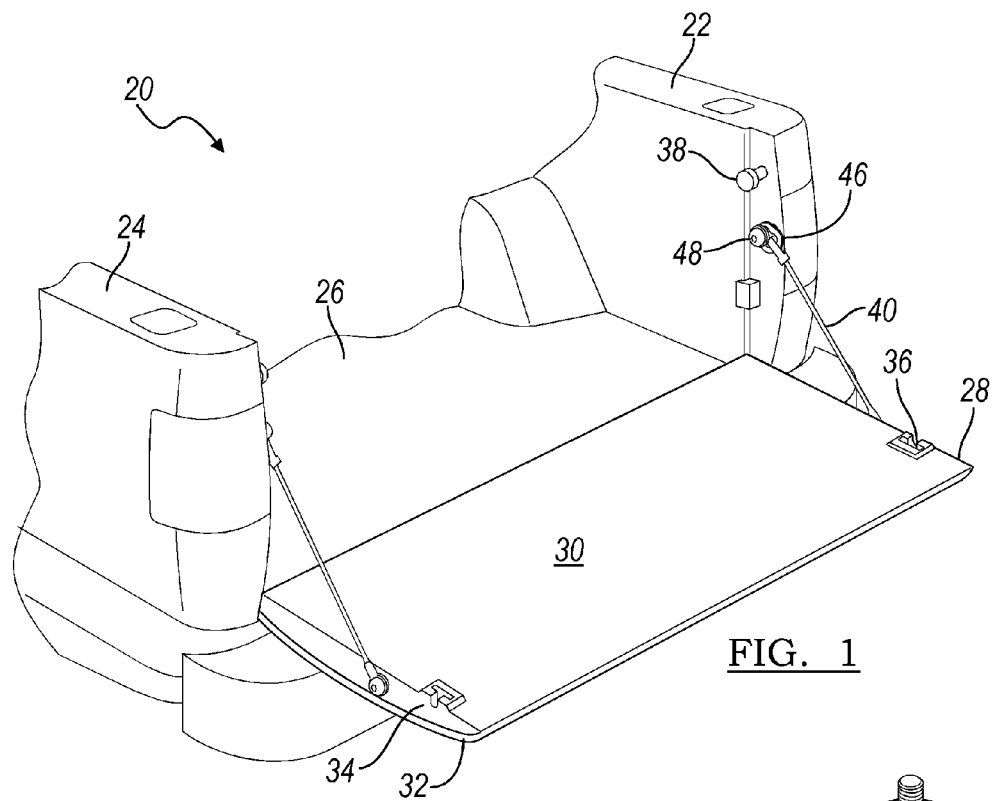
FIG. 1 is a rear perspective view of a portion of a pickup truck.
Figure 2:
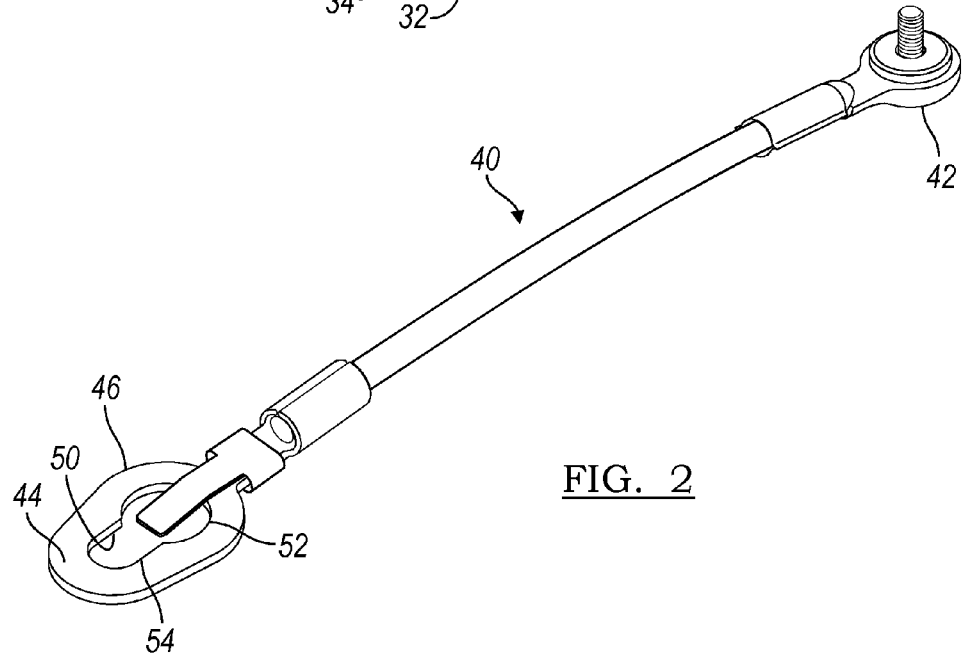
FIG. 2 is a perspective view of a tailgate cable.
Figure 3:
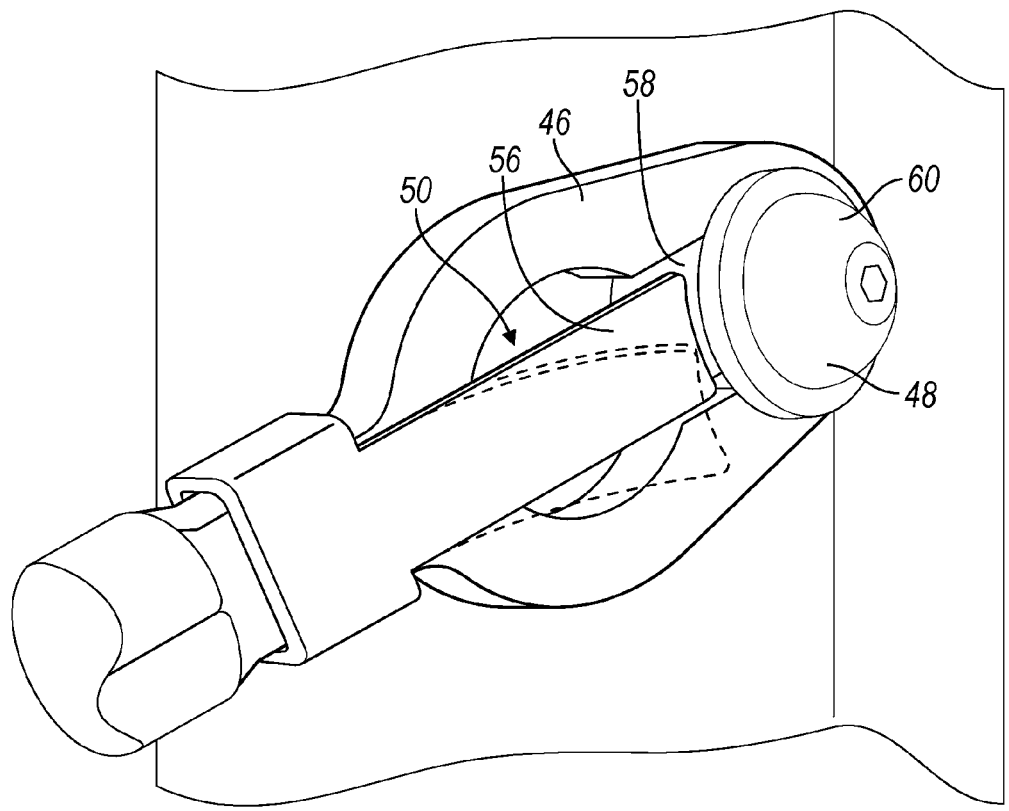
FIG. 3 is a zoomed-in perspective view of the tailgate cable connected to a cable post of the truck.
Figure 4:
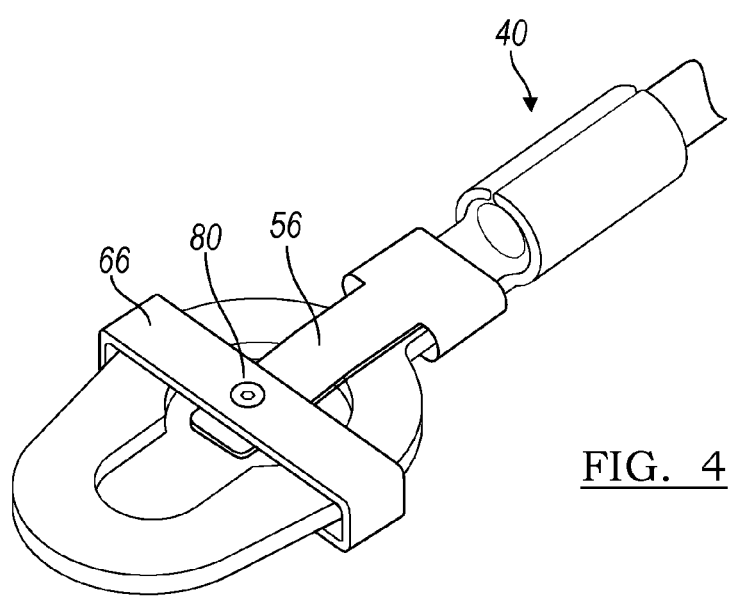
FIG. 4 is a perspective of the tailgate cable of FIG. 2 with an anti-theft device installed.
Figure 5:
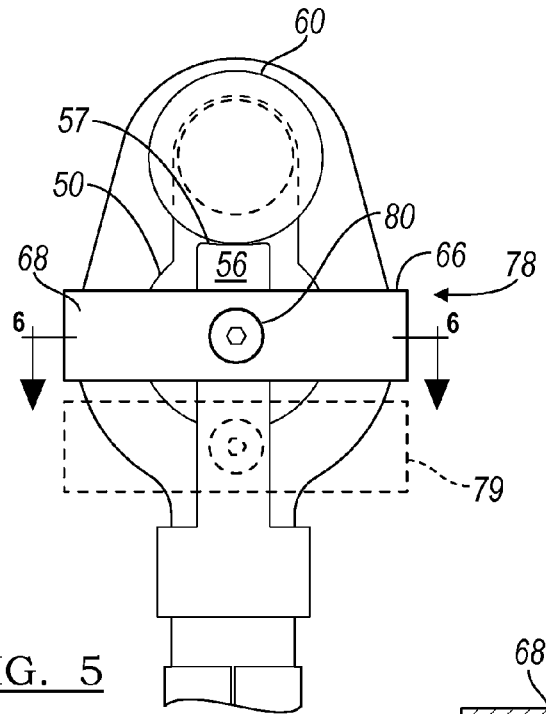
FIG. 5 is a top view of the tailgate cable with the anti-theft device in the blocking position.
Figure 6:
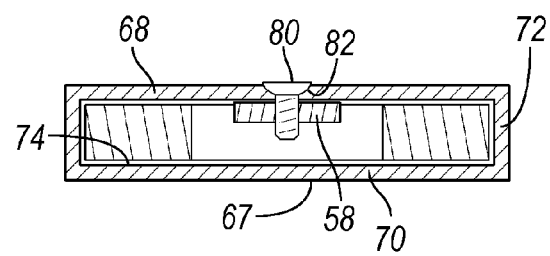
FIG. 6 is a section view of FIG. 5 along cut line 5-5.
Figure 7:
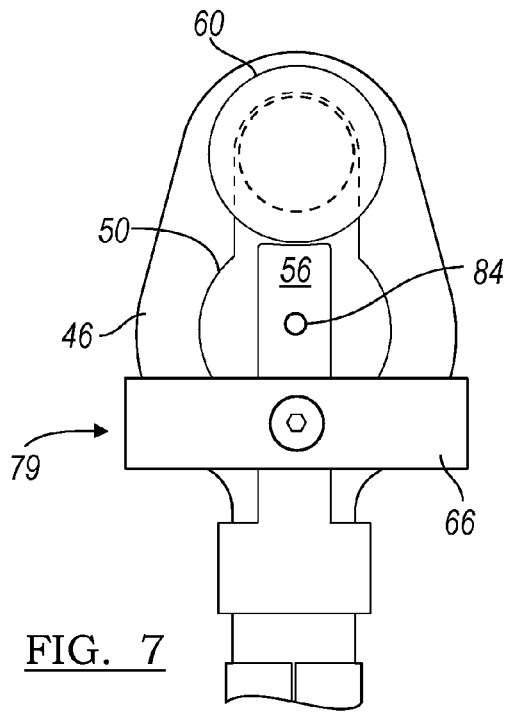
FIG. 7 is a top view of the tailgate cable with the anti-theft device in a releasable position.

Referring to FIGS. 1, 2, and 3 a pickup-truck 20 includes a box 22 having a pair of sidewalls 24 and a bed 26. A tailgate 28 is pivotally attached to each of the sidewalls 24 at a rear end of the box 22. The tailgate 28 includes an interior side 30, an exterior side 32, and a pair of sidewalls 34. Each of the sidewalls 34 includes a pin that is received in a corresponding socket of one of the sidewalls 24. The tailgate 28 pivots between an open position and a closed position along the pins and sleeves. Each tailgate sidewall 34 includes a latch 36 that cooperates with a corresponding locking post 38 connected to one of the sidewalls 24. The latch 36 and the locking post 38 engage to secure the tailgate 28 in the closed position. The tailgate 28 also includes a handle cooperating with the latches 36 to disengage the latches 36 from the locking posts 38 allowing the tailgate 28 to be opened.

The tailgate 28 includes a pair of tension members 40 that support the tailgate 28 when in the open position. Each tension members 40 may be a cable, a chain, a rope, or links that either telescope or fold relative to each other. Each tension member 40 includes a fixed end 42 attached to one of the sidewalls 34 of the tailgate 28, and a free end 44 that has a clip 46. The clip 46 is attachable to a cable post or anchor 48 that is disposed on one of the sidewalls 24. The clip 46 defines a slot 50 that may have a larger portion 52 and a smaller portion 54. The cable post 48 includes a shank 58 and a head 60 that has a diameter larger than the shank. The larger portion 52 is sized to be larger than the head 60 allowing the clip 46 to be received on and off of the post 48. The smaller portion 54 is sized to substantially match the size of the shank 58. The head 60 is larger than the smaller portion 54 preventing detachment of the clip 46 and the post 48 when the post is located within the smaller portion 54. The clip 46 also includes a finger 56 extending over a portion of the larger portion 52. The finger 56 may be a flexible metal strip, such as a flat spring. A tip 57 of the finger 56 engages with the post 48 to hold the post in the smaller portion preventing disconnection of the clip 46 from the post 48.

Tailgate 28 is removable from the box 22. The first step in removing the tailgate 28 is to disconnect the cables 40 from the cable post 48. To disconnect, the finger 56 is bent away from the clip 46, the post 48 is slid into the larger portion 52, and the post 48 is removed from the slot 50. Next, the pins are removed from the sockets. In some vehicles, one of the sockets includes a half-moon cutout allowing one pin to be lifted from the socket. After one pin is free, the other pin is pulled out of its respective socket to remove the tailgate 28.

The tailgate removal process is fairly straightforward and can be accomplished in a short amount of time. This makes the tailgate an easy target for theft. Traditionally, a main deterrent to tailgate theft was the bulk and weight of the tailgate. Modern pickup trucks often employ lighter-weight materials such as aluminum alloys and thinner-gauge steel. Tailgates made from these materials are significantly lighter than their traditional counterparts and are easier to steal.

Tailgate theft can be deterred by increasing the time and difficulty of removing the cable clips 46 from the cable posts 48. Referring to FIGS. 4, 5, 6, and 7, an anti-theft device or locking assembly 66 may be installed onto one or more of the clips 46 to prevent the finger 56 from deflecting, which prevents removal of the clip 46 from the post 48. The anti-theft device 66 includes a sleeve 67 having a top 68, a bottom 70, and a pair of sidewalls 72. The top, bottom, and sidewalls cooperate to define an interior 74. The anti-theft device 66 can be installed by disconnecting the clip 46 from the post 48 and sliding the device 66 over the end of the clip 46 placing a portion of the clip is within the interior 74. The top 68 or bottom 70 is adjacent to the finger 56 and can prevent deflection of the finger 56 depending upon the location of the device 66 relative to the clip 46. For example, the finger 56 cannot be deflected when the anti-theft device 66 is located in a blocking position 78, and can be deflected when the device 66 is slid to a releasable position 79. The releasable position 79 may be any position outside of the blocking position—such as at or near the base 76 of the clip 46. The blocking position 78 may be a range of positions located at the outer half of the finger 56. A removable fastener 80, such as a screw or bolt, is used to secure the anti-theft device 66 in the blocking position 78. The screw 80 may be received within a threaded hole 82 defined in the top 68 or bottom 70 of the anti-theft device 66 and within a hole 84 defined in the finger 56.

The tailgate anti-theft device 66 is designed to be removable without destroying any part of the device. Many pickup-truck users periodically remove the tailgate 28 to increase utility and functionality of the box 22. Thus, a balance must be struck between theft deterrence and removability. If the anti-theft device 66 is too difficult to remove it may annoy authorized users when they wish to remove the tailgate 28. This may cause the users to cease using the anti-theft device 66 rendering the tailgate more prone to theft. If the anti-theft device is not designed to be removed, the utility of the pickup truck is diminished.

The anti-theft device 66 is designed to increase tailgate removal time while still being removable using simple tools—such as a screwdriver, a hex wrench, a socket, etc. Even a slight increase in removal time may deter theft. As such, a permanent locking device may not be need or desirable.

A tailgate cable equipped with the anti-theft device 66 is removed by first removing the removable fastener 80 from the finger 56. Next, the device 66 is slid towards the clip base 76. The finger 56 is now deflected away from the clip 46. With the finger deflected, the cable post 48 is slid from the smaller portion 54 to the larger portion 52, and the post 48 is removed from the slot 50 of the clip 46.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A tailgate assembly of a truck comprising:
   an anchor on the truck;
   a cable attachable between the tailgate and the anchor;
   a clip defining an opening for receiving the anchor;
   a finger secures the clip to the anchor and is deflectable allowing disconnection of the clip and the anchor; and
   a lock on the clip and slidable between a blocking position that prevents deflection of the finger and a releasable position allowing deflection.

2. The tailgate of claim 1 wherein the lock is retained in the blocking position by a locking element.

3. The tailgate of claim 2 wherein the locking element is a removable fastener.

4. The tailgate of claim 1 wherein the finger is a flat spring.

5. The tailgate of claim 1 wherein the lock includes a sleeve that surrounds at least four sides of the clip.

6. The tailgate of claim 2 wherein the finger defines a hole and the locking element is receivable within the hole when the lock is in the blocking position.

7. The tailgate of claim 6 wherein the lock defines a hole and the locking element is receivable within the hole of the lock and the hole of the finger when the lock is in the blocking position.

8. The tailgate of claim 1 wherein the lock includes a top, a bottom, and sidewalls that cooperate forming a hollow rectangular sleeve that receives the clip therein.

9. A tailgate assembly of a truck comprising:
   a tailgate attachable to the truck;
   an anchor on the truck;
   a tension member attachable between the tailgate and the anchor;
   a clip attached to an end of the tension member and defining an opening for receiving the anchor;
   a finger attached to the clip and engaging with the anchor, wherein the finger is deflectable to allow disconnection of the clip and anchor; and
   a lock assembly movable on the clip between a blocking position and a releasable position, wherein the lock assembly prevents deflection of the finger when in the blocking position and allows deflection of the finger when in the releasable position, and the lock assembly is affixed to the clip in the blocking position by a locking element.

10. The tailgate of claim 9 wherein the locking element is a removable fastener.

11. The tailgate of claim 9 wherein the finger defines a hole and the locking element is receivable within the hole when the lock is in the blocking position.

12. The tailgate of claim 11 wherein the lock assembly defines a hole and the locking element is receivable within the hole of the lock assembly and the hole of the finger when the lock assembly is in the blocking position.

13. The tailgate of claim 9 wherein the lock assembly includes a sleeve that surrounds at least four sides of the clip.

14. The tailgate of claim 9 wherein the lock assembly includes a top, a bottom, and sidewalls that cooperate forming a hollow rectangular sleeve that receives the clip therein.

15. A tailgate cable for a truck comprising:
   a clip connectable to a post on the truck and having a finger biased to engage the post preventing disconnection of the clip and post, and deflectable to disengage the post; and
   an anti-theft device surrounding four sides of the clip to prevent displacement of the finger locking the clip to the post, wherein a threaded fastener is receivable through the device and finger to locate the device.

16. The tailgate cable of claim 15 wherein one of the sides defines a first hole and the finger defines a second hole, and wherein the threaded fastener is receivable in the holes.

17. The tailgate cable of claim 16 wherein one of the first and second holes includes threads cooperating with the fastener.

18. The tailgate cable of claim 15 wherein the anti-theft device is slidable between a blocking position and at least one releasable position, the anti-theft device preventing deflection of the finger when in the blocking position and allowing deflection of the finger when in the at least one releasable position.

19. The tailgate cable of claim 15 wherein the sides include a top wall, a bottom wall, and sidewalls that cooperate forming a hollow rectangular sleeve that receives the clip therein.

20. The tailgate cable of claim 15 wherein the finger is a flat spring.

\* \* \* \* \*